Figure 1:
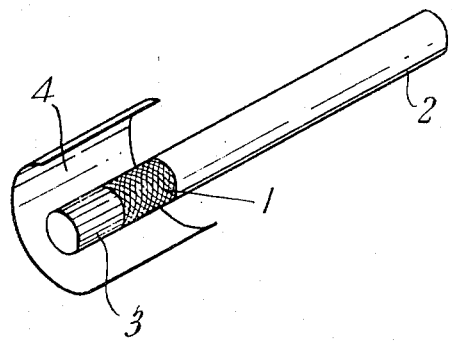

United States Patent
Horsewell et al.

[15] 3,635,226
[45] Jan. 18, 1972

[54] TOBACCO-SMOKE FILTERS

[72] Inventors: Henry George Horsewell; Thomas William Charles Tolman, both of London, England

[73] Assignee: British-American Tobacco Company Limited, London, England

[22] Filed: June 16, 1969

[21] Appl. No.: 833,389

[52] U.S. Cl. ...................... 131/266, 131/10.1, 131/267, 131/269
[51] Int. Cl. ................................ A24b 15/02, A24d 01/06
[58] Field of Search .............. 131/9, 10.1, 261, 261 A, 10.7, 131/267

[56] References Cited

UNITED STATES PATENTS

| | | | |
|---|---|---|---|
| 3,061,479 | 10/1962 | Merritt | 131/17 |
| 2,808,057 | 10/1957 | Jaksch | 131/10.1 |
| 2,863,461 | 12/1958 | Frost | 131/10.1 |
| 3,250,280 | 5/1966 | Hu | 131/10.1 X |
| 3,251,365 | 5/1966 | Keith et al. | 131/10.7 |
| 3,340,879 | 9/1967 | Horsewell et al. | 131/267 |
| 3,366,121 | 1/1968 | Carty | 131/10.1 |
| 3,390,686 | 7/1968 | Irby et al. | 131/10.1 |

FOREIGN PATENTS OR APPLICATIONS

| | | | |
|---|---|---|---|
| 542,106 | 4/1956 | Italy | 131/262 A |
| 531,509 | 8/1955 | Italy | 131/265 |

OTHER PUBLICATIONS

Shmuk, A. A. (1961) The Chemistry and Technology of Tobacco. Available from Off. of Tech. Services, U.S. Dept. Comm. PST No. 96. pg. 499.

*Primary Examiner*—Aldrich F. Medbery
*Assistant Examiner*—G. M. Yahwak
*Attorney*—Kane, Dalsimer, Kane, Sullivan and Kurucz

[57] ABSTRACT

The invention concerns a multicomponent filter for tobacco-smoking articles, such as cigarettes. A three-component filter has at least an absorbent filter section, an aqueous humidifying means and a poorly absorbent section. The humidifying means is to enhance the filtering action and/or serve as a flavorant or flavor-enhancing agent.

5 Claims, 5 Drawing Figures

PATENTED JAN 18 1972

3,635,226

INVENTORS
HENRY GEORGE HORSEWELL
THOMAS WILLIAM CHARLES TOLMAN

Kane, Dalsimer, Kane, Sullivan + Smith
ATTORNEYS

TOBACCO-SMOKE FILTERS

This invention concerns improvements relating to tobacco-smoke filters, particularly but not exclusively such for cigarettes, cigars and like smoking articles.

According to the invention, a three component tobacco-smoke filters with two or more filter sections comprise an absorbent section, an aqueous humidifying means and a poorly absorbent section. The humidifying means may comprise water, or other aqueous medium, which will, during smoking, serve to enhance the action of a filter material, especially that of the absorbent section, with which it is used, or serve as a flavorant or flavor-enhancing agent. It may be a solution or suspension of such a reagent or flavorant.

The absorbent section preferably comprises a highly water-absorbent material, such as paper or paper wadding. The poorly absorbent section preferably comprises a substantially nonabsorbent fibrous or filamentary material, such as cellulose acetate, or a substantially nonabsorbent foam material.

In one advantageous form, the filter may consist of only two sections, the humidifying means being deposited upon or otherwise carried by the material of the absorbent filter section. The humidifying means comprises a highly hygroscopic substance such as lithium chloride magnesium chloride or glycerine as well as water or other aqueous medium so that the absorbent section maintains itself in a wetted condition, whereby good filtration properties are ensured.

In another advantageous form, comprising three sections, the humidifying means is contained in a separate section, preferably located between the highly and relatively poorly absorbent sections. In this form of filter, the humidifying means, i.e., water or an aqueous solution of a filtration-enhancing or flavor-enhancing substance, may be contained in liquid form in an impermeable rupturable enclosure. Thus the aforesaid section may consist of or contain an impermeable capsule or capsules, or groups of capsules, which contain the humidifying means in liquid form and which are rupturable by finger pressure exerted on the said section. This section may also comprise an absorbent material, such as paper or paper wadding, which may surround or embed the capsule or capsules or into which the liquid humidifying means may be absorbed.

With this form of filter, rupture of the capsule or capsules releases the liquid humidifying means which is absorbed preferentially by the material of the absorbent section. Even plain water thus added to ordinary tobacco-smoke filter paper enhances the selective filtration properties of the paper for the volatile constituents of the vapor phase of the smoke.

Particularly effective filtration can be achieved if the material of the absorbent section has been treated with an additive, such as polyethylene imine and/or zinc acetate, having a filtration-enhancing action. Such an additive may alternatively or additionally be incorporated in the liquid humidifying means or applied to absorbent material of the aforesaid separate section. If filter paper has been treated with such an additive having a known selective effect upon the volatile constituents of the smoke, the application of water to the paper produces a very marked improvement in the selective effect. A flavor-enhancing substance may be similarly applied in any of the aforesaid ways.

The quantity of water or aqueous medium provided in such a capsule or capsules will depend upon the requirements for the particular smoking article. In the case of a typical conventional cigarette, it has been found that about 50 mg. will provide an excellent effect. A higher content of, say, 100 or 150 mg. is of advantage with respect to the removal of more volatile constituents only. For practical purposes, a capacity range of from 10 to 500 mg. is preferred.

With filters of each of the forms set forth above, the poorly absorbent section forms a mouth end section of the filter and the absorbent section is located at the other end of the filter where it will be adjacent to the tobacco of the smoking article.

Examples illustrating the preparation of such filters will now be more fully described, together with experimentally determined filtration results obtained from the filters:

EXAMPLE I

Absorbent filter sections were prepared by spraying a solution of lithium chloride onto tobacco-smoke filtering paper of the type known as "Myria" to give a weight of lithium chloride of 40 percent based on the weight of the original paper. The treated paper was allowed to come to equilibrium in ambient humidity conditions and was formed into filter rods which were cut into sections of 15 mm. length. The sections were found by analysis to contain 39.4 percent by weight of lithium chloride and 38 percent water.

These sections were assembled into filter-tipped cigarettes using at the mouth-end of each filter a 15 mm. long nonabsorbent section of cellulose-acetate filter of filament denier 8 and tow denier 48,000, the paper section being adjacent to the tobacco rod. The cigarettes were smoke using a smoking engine which provided one puff per minute of 2 seconds duration and 35 ml. volume. The proportions of tobacco-smoke constituents removed by the filter are shown in table I.

EXAMPLE II

Filter sections were prepared as in example I, except that the paper was pretreated by the addition of 10 percent by weight of polyethylene-imine based on the original weight of the paper. After equilibration, analysis showed the paper sections to contain 10 percent by weight of polyethylene imine, 39.4 percent of lithium chloride and 38 percent of water. Filters were completed and cigarettes prepared and smoked as in example I. The proportions of tobacco smoke constituents removed were determined with the results shown in table I.

TABLE I

| Filter | Baked tar | Nicotine | Constituent removed (percent) Phenols | Aldehydes | Hydrogen cyanide |
|---|---|---|---|---|---|
| Example: | | | | | |
| I | 41 | 32 | 36 | 17 | 59 |
| II | 63 | 63 | 55 | 55 | 81 |

EXAMPLE III

Filter sections were prepared as in example I except that magnesium chloride was used in place of lithium chloride. After equilibration, analysis showed that the sections contained 40 percent by weight of magnesium chloride and 45 percent of water. Filter-tipped cigarettes were prepared and smoked as in example I. The proportions of smoke constituents removed are shown in table II.

EXAMPLE IV

Filter sections were prepared as in example II except that magnesium chloride was used in place of lithium chloride. After equilibration, analysis showed that the sections contained 10 percent by weight of polyethylene imine, 40 percent of magnesium chloride and 45 percent of water. Filter-tipped cigarettes were prepared and smoked as in example I. The proportions of smoke constituents removed are shown in table II.

TABLE II

| Filter | Baked tar | Nicotine | Constituent removed (percent) Phenols | Aldehydes | Hydrogen cyanide |
|---|---|---|---|---|---|
| Example: | | | | | |
| III | 12 | 13 | 15 | 10 | <10 |
| IV | 41 | 42 | 30 | 49 | 67 |

EXAMPLE V

Filter tips were prepared consisting of three sections, an end section of 15 mm. length consisting of tobacco-smoke filtering paper of the type known as "Myria," a center section comprising a sealed capsule containing 50 mg. of water, consisting of a 7 mm. length of plasticized polyvinyl chloride tubing of 6.7 ± 0.1 mm. outside diameter sealed at each end with a friable rosin-based resin, i.e., that supplied under the name Pioneer E 15 resin by Frederick Boehm Ltd., and an end section consisting of a 15 mm. length of cellulose acetate filter of filament denier 8 and total tow denier 48,000.

EXAMPLE VI

Filters were prepared as in example V except that the sealed capsule contained 100 mg. of water.

EXAMPLE VII

Filters were prepared as in example V except that the sealed capsule contained 150 mg. of water.

The filters of examples V–VII were attached to cigarettes with the paper section adjacent to the tobacco and, after the water had been released by breaking the sealed capsule by finger pressure, the cigarettes were smoked as described in example I. The proportions of smoked constituents removed by the filters, as determined by analysis, are shown in table III, which also includes, for comparison, results obtained with similar filters with no content of water.

TABLE III

| Constituent Removed | Weight of water per filter (mg.) | | | |
| --- | --- | --- | --- | --- |
| (%) | 0 | 50 | 100 | 150 |
| Baked Tar | 42 | 45 | 40 | 35 |
| Nicotine | 42 | 41 | 40 | 34 |
| Phenols | 48 | 48 | 48 | 48 |
| Acids | 49 | 64 | 64 | 64 |
| Aldehydes less than | 10 | 11 | 16 | 21 |
| Hydrogen Cyanide | 22 | 42 | 43 | 44 |
| Hydrogen Sulphide less than | 10 | 12 | 17 | 25 |

EXAMPLES VIII–X

Filters, including comparison filters, were prepared as for examples V–VII, except that the paper section was pretreated to contain 10 percent by weight of polyethylene imine calculated on the original weight of the paper. Cigarettes were prepared and smoked as described for examples V to VII and the proportions removed, for the more volatile constituents of the smoke, are given in table IV.

TABLE IV

| Constituent Removed | Weight of water per filter (mg.) | | | |
| --- | --- | --- | --- | --- |
| (%) | 0 | 50 | 100 | 150 |
| Aldehydes | 15 | 70 | 82 | 82 |
| Hydrogen Cyanide | 65 | 83 | 86 | 89 |
| Hydrogen Sulphide | 17 | 52 | 76 | 90 |

Tables III and IV suggest that, for the less volatile components of the smoke, e.g., tar; nicotine, phenols and acids, only a trace of water, e.g., 50 mg., produces a maximum effect which is not improved by further quantities of water. For more volatile components, aldehydes and hydrogen sulphide, and to a lesser extent hydrogen cyanide, increasing water content gives increasing removal, especially when the additive, polyethylene imine, is present as well as the water.

Apart from polyethylene imine, other filtration-enhancing additives, which may be added to the paper section or incorporated into the water contained in the frangible or rupturable section, are zinc acetate, sodium carbonate, trisodium orthophosphate. Suitably the concentration should be up to 15 percent by weight of the paper section and is preferably from 5–10 percent.

By way of further example, comparison of smoke produced by smoking cigarettes through similar filters including a paper section treated with 5 percent by weight of zinc acetate, with and without the addition of 100 mg. of water gave the following results.

EXAMPLE XI

| | Removal (%) | | |
| --- | --- | --- | --- |
| | Aldehydes | Hydrogen Cyanide | Hydrogen sulphide |
| No Water | Less than 10 | 62 | 21 |
| With Water | 19 | 88 | 95 |

For the three-section form of filter, the capsules may be of any convenient shape, for example cylindrical, spherical or ovoid, and the liquid may be encapsulated in various way, as hereinafter described.

Figure 2:
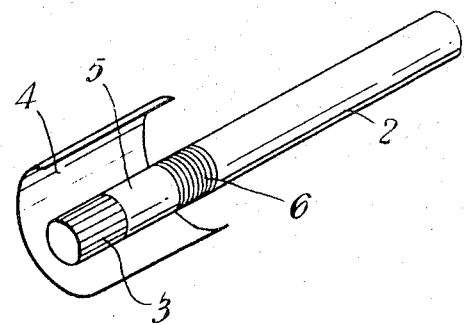
Figure 3A:
Figure 3:
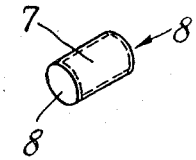
Figure 4:
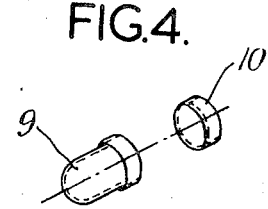

Examples of filter assemblies in accordance with the invention are illustrated in the accompanying drawing, in which:

FIG. 1 is a perspective view of a two-section cigarette filter,

FIG. 2 a similar view of a three-section cigarette filter,

FIGS. 3 and 3a are perspective views of forms of capsule for use in such filters, and FIG. 4 an exploded view of another form of capsule.

FIG. 1 illustrates a cigarette having a filter which comprises an absorbent section 1 between the wrapped tobacco rod 2 and a nonabsorbent section 3. The filter can be wrapped in a liquid impermeable material 4, for example cork tipping or white paper suitably treated to render it impermeable. The sections 1 and 3 of this filter may be constituted in the manner described in any of examples I to IV. Alternatively, lithium chloride or other humidifying means could be dispersed in the section 1 in a plastic or wax material.

In FIG. 2, a section 5 containing a liquid humidifying means is located between a nonabsorbent section 3 and an absorbent section 6. The sections 3, 5 and 6 of this filter may be constituted in the manner described in any of examples V to X. One suitable form of cylindrical capsule which can be used as the section 5 is shown in FIG. 3. It is produced from a thin-walled flexible or semiflexible tube 7 sealed at both ends 8 by a rupturable resin as described under example V. The tube 7 is suitably of a plastics material, such as polyvinyl chloride, polystyrene, polyethylene or polypropylene. It may be of the same external diameter as the other filter sections and may have smooth or fluted walls.

End sealing may alternatively be effected by a frangible wax composition such as a mixture of paraffin-type waxes blended with polyethylene, suitably the composition of this type supplied by Campbell Technical Waxes Ltd.

Another form of end seal may be provided by a rupturable film such as the clear adhesive cellulose-type tape sold under the Trade Mark "Scotch" by Minnesota and Mining Manufacturers Ltd. Seals may consist of combinations of materials, for example a flexible plastics cap with a central aperture closed by a frangible resin or wax. Only one end may have a readily frangible cap, the other end being closed in some other manner.

A cylindrical capsule of the same appearance as that of FIG. 3 may alternatively be made wholly of wax.

A spherical all wax capsule, 7' FIG. 3a, is a practically advantageous form of capsule.

A wax capsule can be produced from wax by a sintering process, which allows of the production of a cup of accurately reproducible dimensions. The cup can readily be sealed by a wax/polyethylene composition.

Alternatively, a capsule may comprise a structure with water-resistant gelatin walls with contents which comprise at least 10 percent by weight of glycerine in an aqueous medium.

As a further alternative, the aqueous medium may be contained in the cells of a frangible foam or cellular material. A suitable foam may be prepared by stirring together a mixture of one part by weight of molten paraffin wax and two parts of water. On cooling slowly, the stable foam forms a soft gel and can be moulded to form units of filter rod dimensions which can then be cut to form filter sections. Conventional polymers of low-molecular weight, for instance low-molecular weight polystyrene, may be used in place of the wax.

As illustrated in FIG. 4, cups formed from a thermoplastic plastics material in sheet form, such as polyethylene or polystyrene, may also be used as capsules. A cap 9 of generally cylindrical shape is closed, after filling, with a cap 10 of plastics material which is sealed to the cup by wax or resin, as previously described.

The encapsulated liquid may, if desired, be absorbed into smoke-filtering material which is also enclosed in the capsules.

We claim:

1. A tobacco-smoke filter assembly comprising: a tubular wrapper within which is disposed in sequential axial alignment, a filter plug of cellulose acetate abutting the mouth end of said assembly and a filter plug comprising a water-absorbent filter material having deposited thereon from about 5 to 15 percent by weight based on the absorbent material of a polyalkyleneimine and a compound selected from the group consisting of lithium chloride, magnesium chloride and mixtures thereof, said filter assembly having from about 10 to 150 milligrams of water absorbed thereon.

2. The invention in accordance with claim 1, wherein the water-absorbent filter material is paper.

3. A tobacco-smoke filter assembly comprising: a tubular wrapper within which is disposed in sequential axial alignment, a filter plug of cellulose acetate abutting the mouth end of said assembly and a filter plug comprising a water-absorbent filter material having deposited thereon from about 5 to 15 percent by weight based on the absorbent material of a polyalkyleneimine, said filter assembly having from about 50 to 150 milligrams of water associated therewith.

4. A tobacco smoke filter assembly comprising: a tubular wrapper within which is disposed in sequential axial alignment, a filter plug of cellulose acetate abutting the mouth end of said assembly, a frangible capsule containing from about 50 to 150 milligrams of water and a filter plug of water absorbent material having deposited thereon a polyalkyleneimine present in amounts from about 5 to 15 percent by weight of absorbent material.

5. The invention in accordance with claim 3 wherein the water-absorbent filter material is paper.

* * * * *